(12) United States Patent
Shaimi

(10) Patent No.: US 11,071,928 B2
(45) Date of Patent: Jul. 27, 2021

(54) HYBRID SUPERCRITICAL FLUID CHROMATOGRAPHY METHOD

(71) Applicant: PIC SOLUTION, Avignon (FR)

(72) Inventor: Mohamed Shaimi, Isle sur la Sorgue (FR)

(73) Assignee: PIC SOLUTION, Avignon (FR)

( * ) Notice: Subject to any disclaimer, the term of this patent is extended or adjusted under 35 U.S.C. 154(b) by 111 days.

(21) Appl. No.: 16/310,736

(22) PCT Filed: Jun. 16, 2017

(86) PCT No.: PCT/FR2017/051592
§ 371 (c)(1),
(2) Date: Dec. 17, 2018

(87) PCT Pub. No.: WO2017/216506
PCT Pub. Date: Dec. 21, 2017

(65) Prior Publication Data
US 2019/0329154 A1     Oct. 31, 2019

(30) Foreign Application Priority Data

Jun. 17, 2016  (FR) ...................................... 1655688

(51) Int. Cl.
*B01D 15/40*     (2006.01)
*B01D 15/18*     (2006.01)
(Continued)

(52) U.S. Cl.
CPC ......... *B01D 15/40* (2013.01); *B01D 15/1871* (2013.01); *G01N 30/466* (2013.01); *G01N 30/88* (2013.01); *G01N 2030/8804* (2013.01)

(58) Field of Classification Search
CPC ................. G01N 30/466; G01N 30/88; G01N 2030/8804; G01N 30/26; G01N 30/468; B01D 15/40; B01D 15/1871
(Continued)

(56) References Cited

U.S. PATENT DOCUMENTS

2005/0277199 A1* 12/2005 Isbell ..................... G01N 30/82
                                                                  436/161
2009/0049891 A1*  2/2009 Shaimi ................. G01N 30/466
                                                                  73/23.36
(Continued)

FOREIGN PATENT DOCUMENTS

FR        2882528       9/2006
FR        3021229      11/2015
(Continued)

OTHER PUBLICATIONS

International Search Report and Written Opinion for PCT/FR2017/051592 dated Oct. 10, 2017.

*Primary Examiner* — Benjamin R Schmitt
(74) *Attorney, Agent, or Firm* — Patterson Thuente Pedersen, P.A.

(57) ABSTRACT

Method of supercritical fluid or liquid chromatography of a product, including the steps of, continuously in this order:
an analytical step according to an analytical route;
a switching step comprising a route changing operation between the analytical route and a preparative route;
if the preparative route is selected in the switching step, a preparative step according to the preparative route.

20 Claims, 5 Drawing Sheets

(51) Int. Cl.
*G01N 30/46* (2006.01)
*G01N 30/88* (2006.01)

(58) Field of Classification Search
USPC .............................................. 73/23.35, 23.41
See application file for complete search history.

(56) References Cited

U.S. PATENT DOCUMENTS

2009/0206037 A1* 8/2009 Shaimi ................ B01D 15/166
    210/639
2011/0306146 A1* 12/2011 Sidhu .................... G01N 30/88
    436/172

FOREIGN PATENT DOCUMENTS

FR        2889665       2/2017
WO   WO2010051005      5/2010

\* cited by examiner

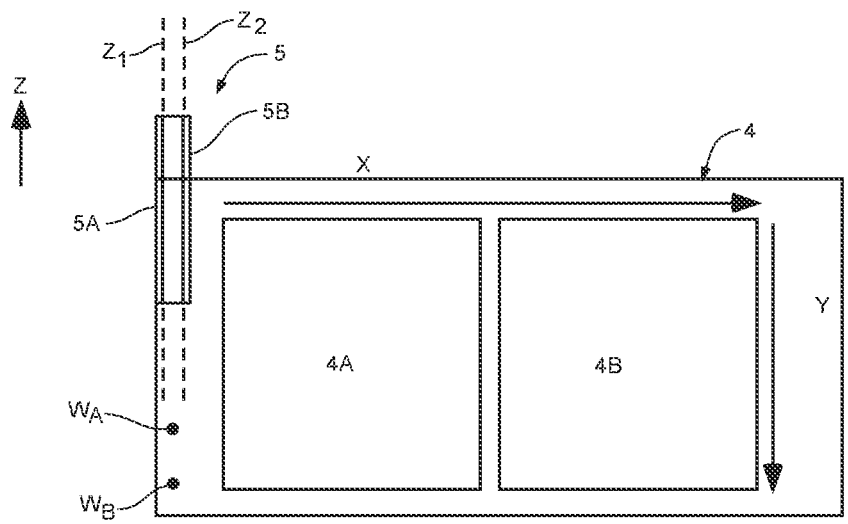
*FIG. 2*
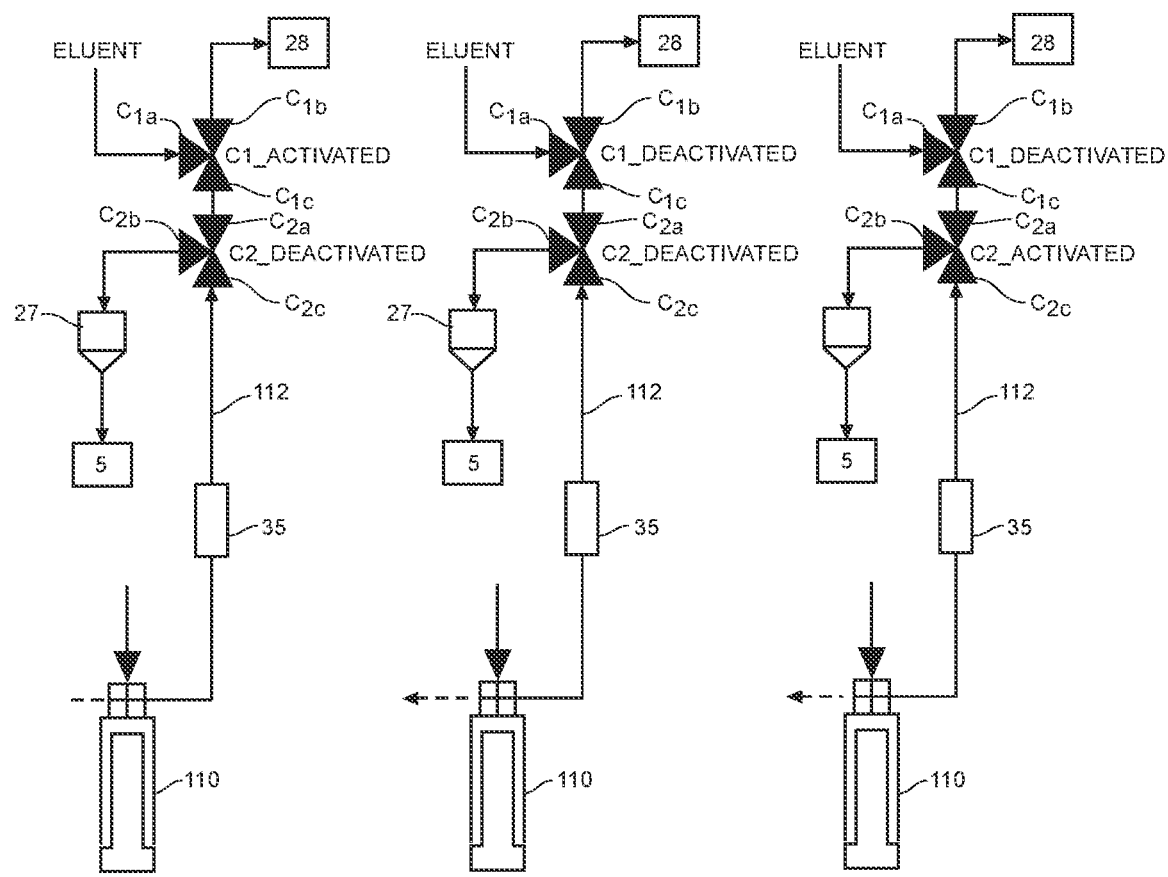
*FIG. 3A*   *FIG. 3B*   *FIG. 3C*

HYBRID SUPERCRITICAL FLUID CHROMATOGRAPHY METHOD

RELATED APPLICATIONS

The present application is a National Phase entry of PCT Application No. PCT/FR2017/051592, filed Jun. 16, 2017, which claims priority to FR 1655688, filed Jun. 17, 2016, the contents of each being incorporated herein by reference in their entireties.

TECHNICAL FIELD

The invention relates to the field of chromatographic techniques. More particularly, the invention relates to a method of supercritical fluide or liquid chromatography of a product P as well as to the equipment for carrying out such a method.

BACKGROUND

Supercritical phase chromatographic analysis, regardless of its field of application, is faced with cases that are increasingly complex. It may be a case in which a large number of constituents present in the product P are to be detected yet very little of product P is injected into the analysis circuit. Thus, the analysis result sometimes indicates a trace of a constituent of interest to the operator. In that case it is necessary to isolate the constituent of interest present in the product P.

Various methodologies of chromatographic analysis have been developed to meet this need. Analysis of the product P is notably carried out by a succession of alternating steps of analytical and preparative chromatography. As an example, the conditions for separation are elaborated firstly with an analytical step. Secondly, these operating conditions are applied to the preparative step, where the constituents of the product P are thus separated and isolated. Thirdly, the separated constituents of the product P are analyzed in an analytical step to verify the purity of the constituents isolated.

"Step" means a succession of operations or actions, following which an analysis objective is attained.

In fact, the analysis objective of an analytical step is to identify quantitatively and/or qualitatively the constituents present in the product P, whereas the analysis objective of a preparative step is to collect several constituents of the product P separately. In this way, each constituent present in the product P is quantified.

However, such a succession of analytical and preparative steps is difficult to implement. At present, each analytical or preparative step is carried out in specialized equipment. For example, to carry out a preparative step followed by an analytical step, the operator must change the chromatographic equipment between the steps. In certain cases, poor separation of the constituents in the preparative step gives rise to unsatisfactory analysis in the analytical step. The operator must then repeat the preparative step, changing the chromatographic equipment before proceeding to the analytical step again. Changing from an analytical system to a different preparative system takes time, and cannot be done without human intervention.

SUMMARY

In this context, embodiments of the invention have the aim of proposing a method of supercritical or liquid phase chromatography allowing successive execution of at least one analytical step and at least one preparative step in a single installation in order to find the best conditions for separation of the product P, to separate the different constituents of the product P, and analyze them to validate their purity. Furthermore, the method according to embodiments of the invention guarantees an accurate analysis result, even for the constituents of low concentration in the product P.

BRIEF DESCRIPTION

With these aims in mind, a method is proposed according to embodiments of the invention for supercritical fluide or liquid chromatography of a product P comprising continuously, in this order:
  an analytical step according to an analytical route comprising:
    an operation of first pumping of a supercritical fluid or liquid and second pumping of a modifier,
    an operation of injection of at least one sample of the product P or of at least one constituent of the product P into at least one chromatography column, the product P or the constituent of the product P being eluted in the column by the supercritical fluid or liquid and the modifier,
    an operation of separation of the constituents of the product P in the column,
    an operation of detection of the composition of the product P or of the constituents of the product P,
  a switching step comprising
    a verification operation comprising a substep of comparing the analysis results with one another or with reference values representing optimum analysis conditions, and
    an operation of automatic route changing between the analytical route and a preparative route as a function of the preceding comparison,
  in the case of a preparative route selected in the switching step, a preparative step according to the preparative route comprising
    an operation of first pumping of a supercritical fluid or liquid and second pumping of a modifier,
    an operation of injection of at least one sample of the product P into at least one chromatography column, the product P being eluted in the column by the supercritical fluid or liquid and the modifier,
    an operation of separation of the constituents of the product P in the column,
    an operation of detecting the constituents of the product P,
    an operation of collecting the constituents of the product P.

Embodiments of the invention therefore offers the advantage of supplying a method of chromatography performing at least one analytical step and one preparative step in a single installation. With the method according to embodiments of the invention, the analytical step and the preparative step are carried out automatically in the best analysis conditions. The operator therefore no longer needs to change equipment between these analysis steps, giving him a saving of time, space and capital expenditure, as a single system is required instead of two separate systems.

During pumping of modifier in the analytical step, it is possible to introduce different modifiers for each of the chromatographic columns. After being injected into each column, the product P is thus in different conditions of analysis. In this instance, the verification operation before the switching step consists of comparing the analysis results of the chromatographic columns with one another or comparing the results of each column with the reference values to determine which column/modifier pair represents the best analysis condition. Thus, in the next preparative step, this analysis condition is applied to give the optimum result for the method in general.

In another example, it is possible to use a single modifier. In this case the verification operation consists of comparing the analysis result with reference values that represent the optimum analysis conditions. If the result corresponds to the reference values, the change to the preparative route is carried out.

Thus, the switching step makes it possible to ensure that the optimum analysis condition is applied in the next preparative step. In other words, it makes it possible to select the preparative route after the best analysis condition is determined or after the analysis condition corresponds to predefined reference criteria.

It should be noted that after the first analytical step, the different constituents of the product P are identified. Then, owing to the preparative step, the collected constituents are available to the operator for optional detailed analysis of the constituent of interest.

According to an advantageous embodiment of the invention, the method comprises continuously, in this order:
  a first analytical step,
  a first switching step,
  a preparative step,
  a second switching step, and
  a second analytical step comprising the same operations as the first analytical step.

Thus, the second switching step makes it possible to attain a second analytical step during which the constituents previously separated and collected are automatically analyzed qualitatively and quantitatively one by one. This second analytical step therefore makes it possible to verify the purity of each constituent collected.

Thus, during separation of a mixture containing a product P,
  there is a first analytical step for elaborating the separation conditions;
  automatic passage to the preparative step for separation of the product P, and
  automatic passage to a second analytical step for analysing the fraction of the product P collected in the preparative step.

According to a feature of an embodiment of the invention, the second switching step comprises:
  an operation of automatic route changing between the preparative route and the analytical route
  an operation, in the analytical step, of checking the purity of the fractions of the product P in the preparative step According to another feature of the invention, the analytical or preparative step comprises an operation of recycling the supercritical fluid, once the collection operation in the preparative step has ended. In other words, in the preparative step, the recycling operation takes place whenever the product P is not in the process of being collected at atmospheric pressure by means of a collecting robot.

Thus, the recycled supercritical fluid is introduced again into the circuit to be condensed, then pumped and mixed again with the modifier to be used again. This reduces the cost of carrying out the method.

According to another feature of an embodiment of the invention, the analytical step comprises a recycling operation following the detection operation of the analytical step. The recycling step thus makes it possible to recover the supercritical fluid for reuse.

According to a feature of an embodiment of the invention, the analytical step and the preparative step each comprise
  a first cleaning operation of an injection and collection circuit upstream of the operation of first pumping and of second pumping, and
  a second cleaning operation of the injection and collection circuit downstream of the collection operation of the preparative step or of the detection operation of the analytical step, the second cleaning operation being the last operation of the analytical step and of the preparative step.

In this way there is no of risk of contamination of the various constituents of the product P in the injection circuit, in the collection circuit and/or in the test tubes containing these elements. This therefore ensures good conditions for analysis of the product P.

According to another feature of an embodiment of the invention, the detection operation is performed by ultraviolet-visible spectrophotometry and/or by mass spectrometry, and/or any other detector for detecting chemical compounds.

Embodiments of the invention further relates to an installation for supercritical phase chromatography of a product P arranged for carrying out the analytical and preparative methods according to the invention. The installation comprises an analytical route and a preparative route installed in parallel, each comprising:
  a first pump of supercritical fluid or liquid,
  a second pump of modifier,
  an analysis system comprising at least one chromatographic column,
  a system for injecting at least one sample of the product P or of the separated constituents of the product P into the columns of the analysis system, the injection system being arranged between the first pump of the supercritical fluid or liquid and the analysis system.

The installation further comprises a system for collecting fractions of the product P and supercritical fluid to be recycled; and at least one detection system.

According to an embodiment of the invention, the installation comprises:
  a first switching valve arranged upstream of the injection system, which is positioned so as to allow injection of the product P or of the constituents of the product P into the analytical route or into the preparative route,
  a second switching valve arranged upstream of the pumps of supercritical fluid or liquid, which is actuated so as to allow the supercritical fluid or liquid to circulate in the analytical route or in the preparative route, and
  a computer control device.

According to an embodiment of the invention, the first switching valve and the second switching valve are activated at the same time by the computer control device so as to direct the product P or the constituents of the product P respectively and the supercritical fluid or liquid into the route resulting from the switching step.

The computer control device controls the position of each of the first and second valves as a function of the result of the analysis, for example at the end of a first analytical step. Thus, the installation according to an embodiment of the invention makes it possible to pass from an analytical step to a preparative step or vice versa automatically while ensuring optimum quality of the analysis of the product P or of the constituents of the product P.

According to a feature of an embodiment of the invention, a set of plates comprising recipients and a sampling device comprising several automated arms are configured for collecting or depositing the product P or fractions of the product P disposed in the set of plates. Thus, collection of the samples disposed in the plates is completely automated owing to the sampling device.

Advantageously, but optionally, the set of plates consists of a first plate reserved for the samples of the crude product P and a second plate reserved for the separated and collected constituents of the product P. Organization of the plates in this way gives the operator access either to the product P or to the constituents without needing to identify the contents of the test tubes.

According to another feature of an embodiment of the invention, the installation comprises a system for recycling supercritical fluid installed downstream of the collection system.

According to a feature of an embodiment of the invention, the collection system is connected on the one hand to a recycling system and on the other hand to a sampling device. This collection system is arranged so that the supercritical fluid is sent to the recycling system once the fractions of the product P have been sent to the sampling device.

In this way, recycling of the supercritical fluid may be performed in an installation using an open-bed collection system. In fact, when this collection system is operating, the fluid is at atmospheric pressure, which complicates the recycling operation. The fluid is sent to the recycling device whenever the product P is not sent and collected at atmospheric pressure by the collecting robot.

Thus, as the supercritical fluid to be recycled is not at atmospheric pressure, it is therefore more in contact with the exterior, which allows simple and effective recycling of the supercritical fluid for reuse.

According to another feature of an embodiment of the invention, a flow regulator is installed after the switching means. The flow regulator makes it possible to control the flow going to the detection system or systems.

According to a feature of an embodiment of the invention, the detection system is made up of two detection systems installed in parallel, the first system being an ultraviolet-visible spectrophotometer and the second system being a mass spectrometer. Thus, at the end of the method, the operator receives two types of analysis result, which allows him to select which type of detection is the most appropriate for the nature of the product P.

Other features and advantages will become clear to a person skilled in the art on reading the examples hereunder, illustrated by the appended figures, given for purposes of illustration and not in any way limiting.

BRIEF DESCRIPTION OF THE FIGURES

FIG. 2 is a schematic representation of a set of plates for test tubes and a collecting device comprising several automated arms of the installation in

FIG. 1;

FIGS. 3A, 3B and 3C are schematic representations of the operating steps of a system for collecting fractions of the installation in FIG. 1;

PRELIMINARY REMARKS

In general, an eluent constitutes the mobile phase in chromatography. In the case of supercritical phase chromatography, the eluent is a fluid in the so-called "supercritical" (SC) state. By definition, a supercritical fluid has a density close to that of a liquid and viscosity and diffusivity close to those of a gas. In practice, carbon dioxide ($CO_2$) is the most used supercritical fluid.

Moreover, "modifier" means any organic co-solvent added to modify the polarity of the eluent in order to promote solubility of the constituent to be analyzed. Possible modifiers are methanol, ethanol, isopropanol, acetonitrile or any other organic solvent or mixture of organic solvents.

DETAILED DESCRIPTION

Figure 1:
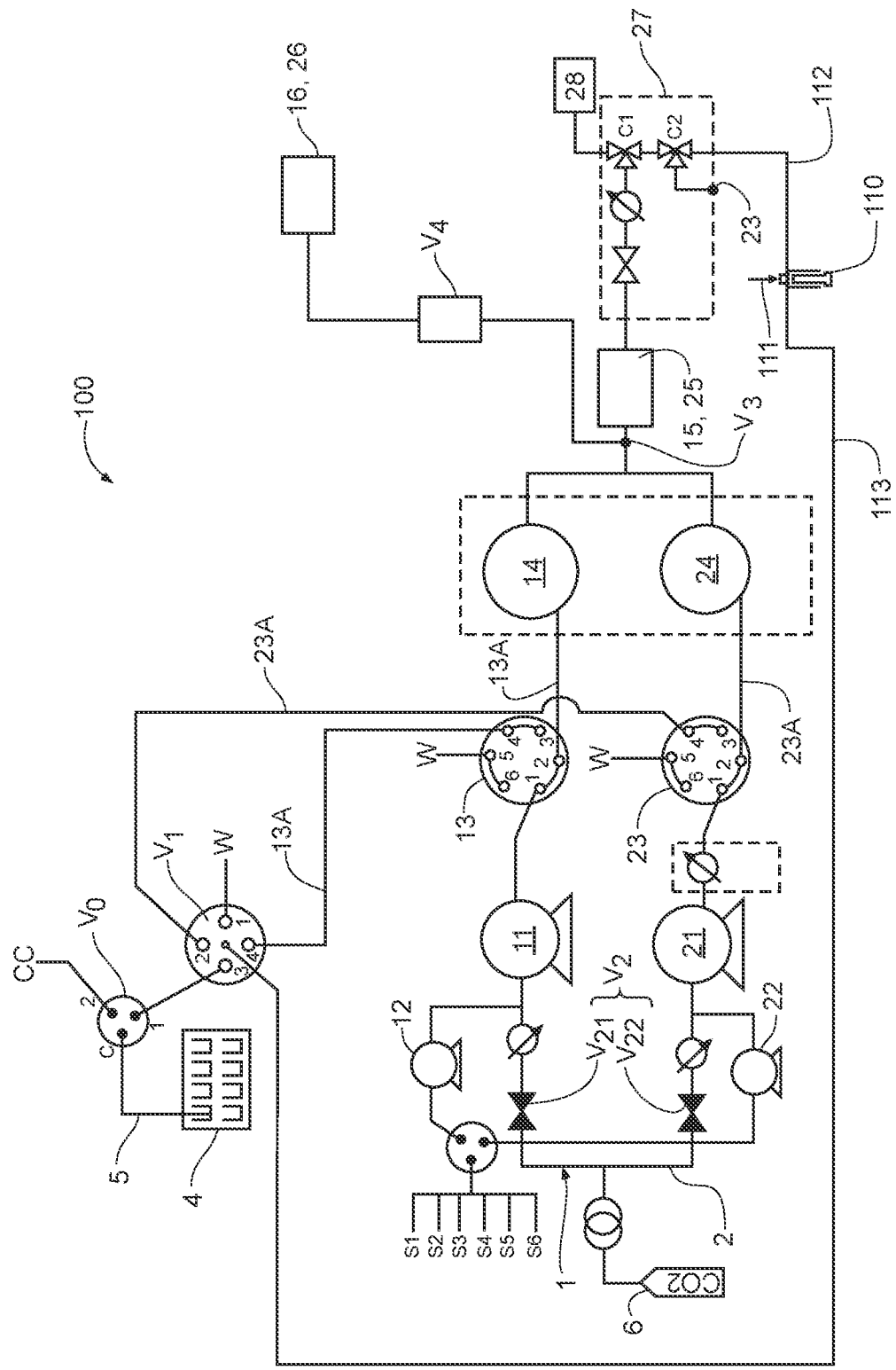
FIG. 1 is a schematic representation of an embodiment of the installation according to the invention.

FIG. 1 illustrates an embodiment example of an installation 100 according to an embodiment of the invention. The installation 100 comprises an analytical route 1 and a preparative route 2 installed in parallel. Each route comprises elements for carrying out an analytical step or a preparative step depending on its purpose.

The analytical route 1 and the preparative route 2 have in common a set of plates 4, a sampling device 5 and a reservoir of supercritical fluid 6.

Before being injected into the preparative or analytical route, one or more samples of the product P are disposed in test tubes arranged in the set of plates 4 illustrated in detail in FIG. 2. The set of plates 4 consists of two subsets of plates: one or more sample plates 4A reserved for the samples of the product P, and a collecting plate or several collecting plates 4B reserved for the fractions of the constituents of the product P.

An automated sampling device 5 proceeds to withdraw the product P from the sample plate 4A or the constituents from the collecting plate 4B. The sampling device comprises two automated arms 5A and 5B mounted movably in translation along a vertical axis Z. In addition, the automated arms 5A and 5B move in a horizontal plane passing over two horizontal axes X and Y of plate 4, called the XY plane hereinafter. The product P or constituent of the product P is taken by aspiration by the automated arm 5A from the test tubes disposed on the plates 4A or 4B. The fractions containing the pure constituents of the product P are collected by means of the automated arm 5B.

By means of a first switching valve $V_1$, the product P or its constituents are directed either to an analytical injection system 13 in at least one analytical chromatographic column 14 for the analytical route 1, or to a preparative injection system 23 in at least one preparative chromatographic column 24 for the preparative route 2. In the following paragraphs, the analytical chromatographic column 14 will be called the analytical column 14. Similarly, the preparative chromatographic column 24 will be called the preparative column 24.

The analytical injection system 13 and preparative injection system 23 are located in the analytical injection circuit 13A and preparative injection circuit 23A, respectively.

In one embodiment example, the analytical route 1 comprises nine analytical columns 14. The preparative route 2 comprises six preparative columns 24. Moreover, in this embodiment example, the analytical injection system 13 is adapted for operating with analytical columns 14 with an inside diameter between 2.1 mm and 1 cm. Similarly, the preparative injection system 23 is adapted for operating with preparative columns 24 whose inside diameter is greater than 1 cm.

According to an embodiment of the invention, a reservoir 6 of supercritical fluid, in the present case carbon dioxide ($CO_2$), is located upstream of a second switching valve V2. The reservoir 6 and the second switching valve V2 are placed upstream of the injection systems 13 and 23. In this example, the second switching valve V2 comprises two two-way valves V21 and V22 arranged on the analytical route 1 and on the preparative route 2, respectively. In another embodiment example, the second switching valve V2 is a three-way valve.

The second switching valve $V_2$ has the purpose of directing the flow of $CO_2$ to the analytical route 1 or the preparative route 2, according to the operator's choice. Once the $CO_2$ flow is in the selected route, it is condensed, pumped and pressurized in order to reach its supercritical state. The $CO_2$ flow is pumped by the first analytical pump 11 or by the first preparative pump 21 depending on the route selected.

The first analytical pump 11 can deliver a maximum flow of 20 mL/min, for example. In the preparative mode, the first preparative pump 21 can deliver a higher flow, which may be up to 200 mL/min, for example.

According to an embodiment of the invention, modifiers are added in the analytical route 1 or in the preparative route 2 by second pumps 12 and 22, respectively. In the example illustrated, the second pump 12 (or 22) for modifiers is placed upstream of the first pump 11 (or 21) for the supercritical fluid. In another embodiment example, the second pump 12 (or 22) for modifiers is located downstream of the first pump 11 (or 21) for the supercritical fluid.

According to an embodiment of the invention, the installation 100 also comprises a detection system 15, 16, 25 and 26 placed downstream of the chromatographic columns 14 and 24. In the example illustrated here, each route comprises two detection systems of different kinds: a UV-visible spectrophotometer 15 or 25 and a mass spectrometer 16 or 26. The two detection systems 15, 16 and 25, 26 are installed in parallel to one another.

In another embodiment, the detection system or systems may be another type of detector for detecting chemical compounds. As an example, the detector may be a light-scattering evaporative detector.

A switching means V3 is located upstream of the detection systems at the point of convergence of the analytical route 1 and preparative route 2 in order to direct a part of the eluent containing the product P or its constituents received from the chromatography columns 14 or 24 to the optimum detection system or systems corresponding to the mode of analysis. The switching means is for example a stream splitter, also called a by-pass V3.

In the example illustrated, the by-pass V3 is followed by a flow regulator V4. The latter is arranged so as to regulate and send a part of the flow of eluent to the first detection system 15 or 25 and the other part of the flow to the second detection system 16 or 26 concomitantly. As an example, the flow regulator V4 comprises two by-pass circuits, each consisting of tubes with inside diameters and lengths consistent with the concentration of sample going to a specific detection system, allowing predetermined pressure losses to be generated.

In one operating mode, the flow regulator V4 does not allow any flow to pass, and all of the flow of eluent is sent to the detection system 15, 25.

In another embodiment example, the flow regulator V4 and the switching means V3 are not present in the installation. Thus, the entire flow of eluent is directed to a single detection system to be analyzed, which is sufficient for certain analyses.

According to an embodiment of the invention, downstream of the detection systems 15, 25, the installation 100 comprises a collection system 27 followed by a recycling system 28 for supercritical fluid $CO_2$.

Thus, after the detection step, the fractions of the constituents of the product P may be collected and deposited in the collecting plate 4B, via a pipe 29 that is connected to the sampling device 5 at the level of the automated arm 5B, which then allows the fractions to be deposited on the collecting plates 4B, after passing through a gas-liquid separator, or directed by a valve C1 to the recycling system 28 for recycling the supercritical fluid $CO_2$, which is recovered and fed back into the circuit before the second switching valve $V_2$.

Furthermore, the installation 100 according to an embodiment of the invention comprises cleaning means 110,111, 112,113,W,WA,WB for cleaning various routes of the installation. These means comprise a feed 111 of a cleaning solvent to a syringe pump 110. This syringe pump 110 can return the cleaning solvent to the collection system 27 via a pipe 112 and a cleaning valve C2. This syringe pump can return to the analytical route 1, the preparative route 2, the sampling device 5 and set of plates 4, via the first valve V1. For carrying out cleaning of the analytical route 1 and preparative route 2, the injection systems 13 and 23 comprise an evacuation outlet W. Similarly, the first valve V1 comprises an evacuation outlet W. Finally, the set of plates 4 comprises an evacuation outlet for sampling WA associated with the automated arm 5A and with the sample plates 4A and an evacuation outlet for collection WB associated with the automated arm 5B and with the collecting plates 4B.

FIGS. 3A, 3B and 3C illustrate the operating steps of an example of the collection system 27.

The collection system 27 comprises a first three-way valve C1 comprising:
 a first route C1a receiving the eluent from the analysis system, for example that of the preparative route. Here, the eluent contains a fraction of the product P, the supercritical fluid and the modifier;
 a second route C1b connected to the recycling system 28; and
 a third route C1c connected to a second three-way valve C2.

The first valve C1 has a deactivated position in which the first route C1a communicates with the second route C1b. In this deactivated position, the eluent is directed to the recycling system 28. The first valve C1 in the deactivated position is illustrated in FIG. 3B or 3C.

The first valve has an activated position in which the first route C1a communicates with the third route C1c. Thus, in this position, the eluent is directed to the second valve C2.

The first valve C1 is followed by a second three-way valve C2. Like the first valve, the second C2 comprises three routes:
 a first route C2a connected to the first valve C1;
 a second route C2b connected to a gas-liquid separator 27 and then to the sampling device 5;

a third route connected to the syringe pump 110 via line 112.

A non-return valve 35 is placed on line 112 in order to prevent the eluent going to the syringe pump 110 in case of leakage.

The second valve C2 also has two positions: an activated position and a deactivated position.

In the deactivated position, illustrated in FIGS. 3A and 3B, the first route C2$a$ communicates with the second route C2$b$. Thus, the eluent received from the first valve C1 is directed to the gas-liquid separator 27 allowing the gaseous $CO_2$ to be separated from the liquid containing the purified constituent of the product P. The purified constituents of the product P are then sent to the sampling device 5 after separation of the gaseous $CO_2$ in the separator.

In the activated position, the second route C2$b$ communicates with the third route C2$c$. This makes it possible to circulate fresh solvent in the lines of the collecting system 27 as well as of the sampling device 5. These lines are therefore cleaned to prevent contamination of the product P in subsequent collection.

We shall now describe the operating steps of the collection system during recovery of an eluent received from the detection system. The latter detects the presence of the product P in the eluent. Following this detection, the installation sends the order to the collection system 27 to begin the first step illustrated in FIG. 3A.

During this first step, the first valve C1 is activated whereas the second valve C2 is deactivated. Consequently, the eluent passes directly from the first valve C1 to the second valve C2 and is then directed to the separator 27. The purified constituents of the product P are then directed to the sampling device 5, more precisely to one of the automated arms 5A or 5B.

In the example illustrated, collection is carried out after a preparative step. For this reason, the purified constituents of the product P are sent to arm 5B, which deposits them in one of the tubes of the collecting plate 4B.

When the detection system no longer detects the product P in the eluent, it sends a signal for the collection system 27 to pass to a second step illustrated in FIG. 3B. During this second step, the first and second valves C1 and C2 are deactivated. As a result, the eluent not containing any product P is sent to the recycling system 28. The valve C1, as positioned, isolates the supercritical fluid contained in the eluent from the environment. This makes it possible to increase the pressure of the supercritical fluid, for example to 50 bar, with a view to its recycling.

Then the collection system 27 passes to a third step as shown in FIG. 3C. In this step, the second C2 is switched to the activated position. In parallel, the syringe pump 110 is actuated to introduce fresh solvent and clean the lines of the collection system 27 and sampling device 5.

In one embodiment of the invention, the cleaning step comprises two substeps. A first cleaning substep consists of recovering the residues of the product P remaining in the lines and sending them to the sampling device 5. A second substep is a simple cleaning; the fresh solvent from this cleaning is sent to a waste tank. Thus, after the third step, the collection system 27 is ready again for another chromatographic separation.

Referring to FIGS. 4 to 7, we shall now describe in detail a method of chromatography according to an embodiment of the invention. This method is employed in and by the installation 100 that has just been described above.

The method of chromatography according to an embodiment of the invention comprises, continuously and in this order, a first analytical step 10, a first switching step X1 and a preparative step 20.

Figure 4:
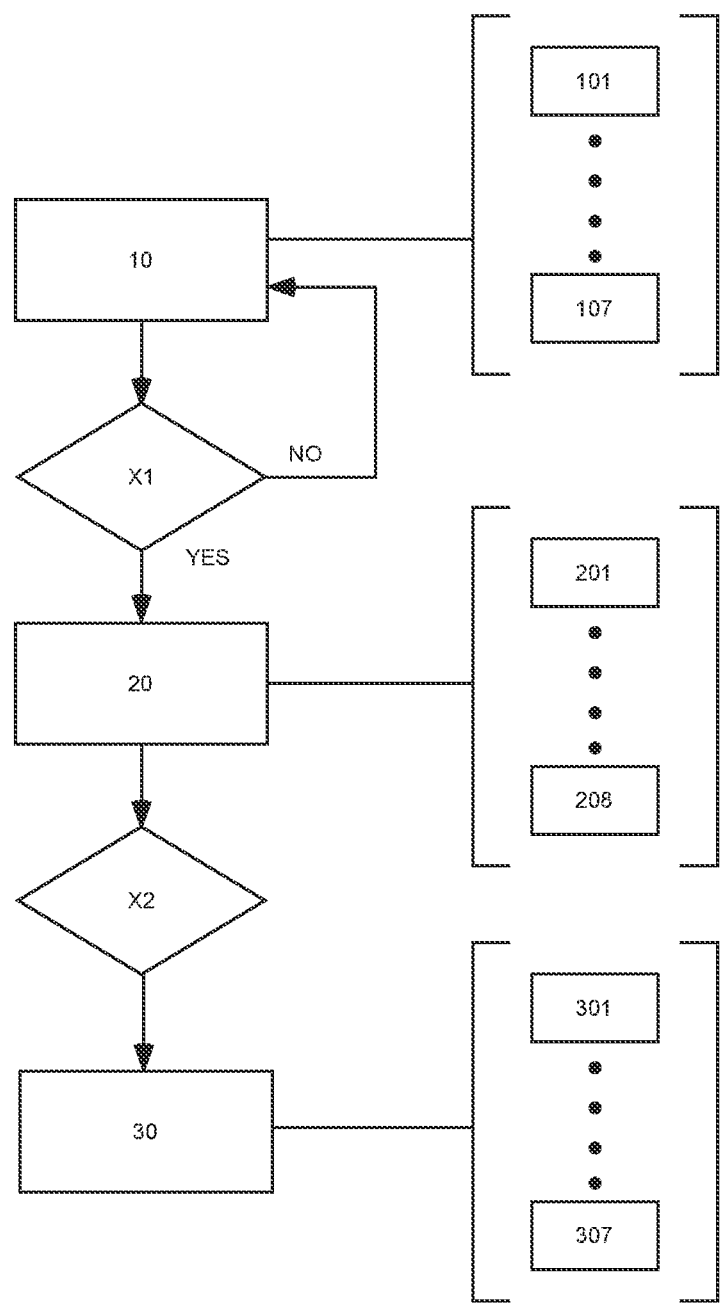
FIG. 4 is a schematic representation of an embodiment of the method according to the invention.

As a variant embodiment, illustrated in FIG. 4, the method comprises, after the preparative step 20, a second switching step X2 and a second analytical step 30.

During a preliminary step (not illustrated), the samples of the product P are placed in the sample plate 4A. In practice, illustrated in FIG. 1, this step is provided by a valve V0 of the installation 100, which directs the product P received from a chemical process CC to the sample plates 4A. After defining some parameters connected with the conditions of analysis, notably the pressure, the temperature and the flow rate of eluent, the operator starts the method of chromatography according to the invention.

Figure 5:
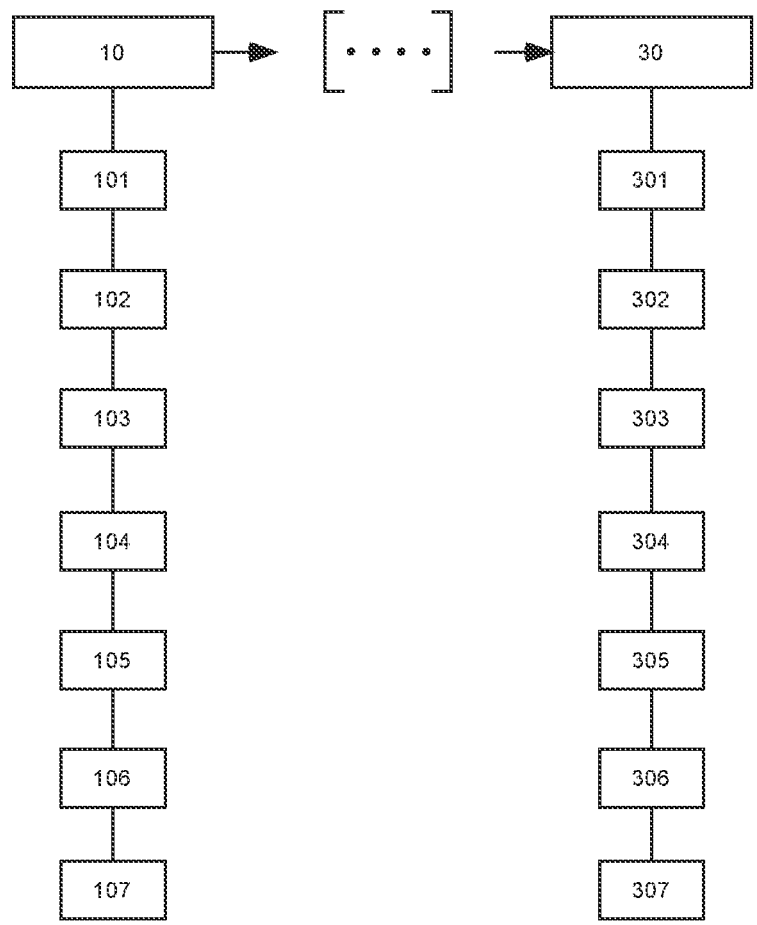
FIG. 5 is a schematic representation of two analytical analysis steps forming part of the method in FIG. 4.

According to an embodiment of the invention, the method begins with a first analytical step 10 illustrated in FIGS. 4 and 5.

During the first analytical step 10, the first automated arm 5A goes down towards the sample plate 4A in the XY plane and along its displacement axis Z1 in order to take an amount of product P. The valve V0 is switched in order to connect the sampling device 5, and in particular the first automated arm 5A to the first switching valve V1 which in its turn is switched to the analytical route 1.

The second switching valve V2 is switched to the analytical route 1. The $CO_2$ flow is then directed from reservoir 6 and/or from the recycling system 28 to the analytical route 1. It is then condensed and pressurized to attain a supercritical state. Then an operation 102 of first pumping of the supercritical fluid and of second pumping of at least one modifier S1-S6 is carried out.

Next, an injection operation 103 is carried out, consisting of injecting the product P, once taken by the first arm 5A, to the analytical injection system 13 in order to introduce them into at least one chromatographic column 14. At the outlet of the analytical injection system 13, the product P is then mixed with the supercritical fluid $CO_2$ and the modifier. The mixture is then introduced into at least one of the analytical columns 14, where the product P is separated as it is eluted in the analytical column 14 during a separation operation 104.

In one embodiment example, various modifiers S1-S6 are each introduced into an analytical column 14. For example, ethanol in a first column, methanol in a second column, isopranol in a third column and so on. The number of modifiers introduced into each column 14 is decided by the operator. Thus, the product P, injected into each of the columns, is in different conditions of analysis.

Then an operation of detection 105 of the composition of the product P is carried out by the detection systems 15 and 16. In this example, a by-pass V3 is provided between the separation operation 103 and the detection operation 104. After this by-pass operation carried out by the means V3 and the flow regulator V4, the flow is separated into a part of the flow of the eluent to the first detection system 15 and the other part to the second detection system 16 in such a way that the two detection systems 15,16 perform detection of the composition of the product P at the same time. The amount of flow going to the second detection system 16 is controlled by the inside diameters and lengths of the tubes arranged on the two routes of the flow regulator V4.

In the example illustrated, the first analytical step 10 further comprises an operation of recycling 106 of the supercritical fluid $CO_2$ then in the gaseous state following the detection operation 105.

The supercritical fluid is then in the gaseous state and it may be mixed with a residual amount of modifiers.

In one embodiment example, the first analytical step 10 also comprises, upstream of the operation 102 of first pumping and of second pumping, a first cleaning operation 101 which consists of cleaning the injection circuit 13A and the sampling arm 5A. Moreover, a second cleaning operation 107 takes place after the detection operation 105. In the example illustrated, the second cleaning operation 107 is carried out after the recycling operation 106 and the last operation of the first analytical step 10.

A first switching step X1 is carried out after the first analytical step 10.

Figure 6:
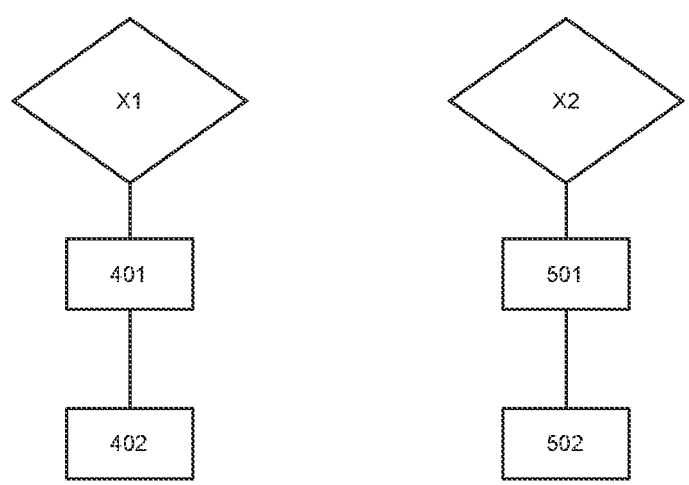
FIG. 6 is a schematic representation of two switching steps forming part of the method in FIG. 4.

During the first switching step X1 in FIGS. 4 and 6, a route changing operation 402 consists of switching the switching valves V1 and V2 to the preparative route 2.

According to one embodiment example, the first switching step X1 firstly comprises a verification operation 401.

Firstly, the verification operation 401 compares results of analyses received from the detection operation 103 described above. Secondly, depending on the result of comparison, the route changing operation 402 is or is not carried out.

In the example in which various modifiers S1-S6 are each added to an analytical column 14, the verification operation 401 compares the analysis results from the analytical columns 14 with one another in order to determine the column having the optimum separating power, and hence optimum analysis conditions. Thus, the modifier S1, . . . , S6 giving the best conditions will be used in the rest of the method for the product P and its components.

In another embodiment example with a single modifier S1, . . . , S6, the verification operation 401 simply compares the analysis results with reference values that represent the optimum analytical conditions. If the comparison proves satisfactory, i.e. if the analysis results correspond to the reference values, the route changing operation 402 is carried out. Otherwise the method goes back to the first analytical step 10.

In the case when preparative route 2 is selected in the switching step X1, a preparative step 20 is then carried out.

Figure 7:
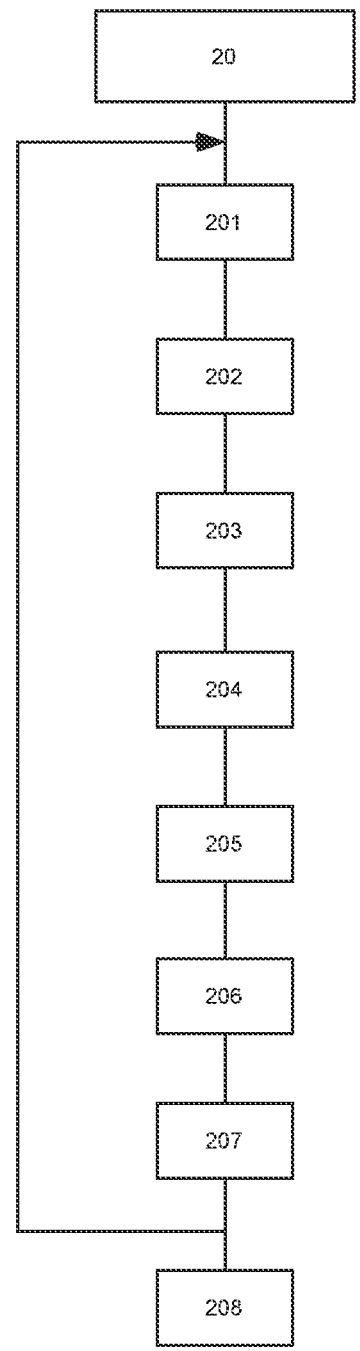
FIG. 7 is a schematic representation of a preparative step of the method in FIG. 4.

During the preparative step 20, illustrated in FIGS. 1 and 7, the first automated arm 5A goes down towards the sample plate 4A to take a defined amount of product P. This time, the amount of the product taken is greater than the amount taken in the first analytical step 10 described above.

Next, the operations, similar to those of the first analytical step 10, are carried out as follows:
- an operation 202 of first pumping of the flow of pressurized and condensed $CO_2$ and second pumping of a modifier,
- an operation of injection 203 of the product P into at least one preparative chromatography column 24,
- an operation of separation 204 of the constituents of the product P;
- an operation 205 of detection of the constituents of the product P by the detection systems 25 and 26.

Moreover, the first analytical step 10 comprises an operation of collecting 206 the constituents of the product P. In fact, after they are separated in a preparative column 24, the constituents of the product P are each passed into the separators of the collection system 27 to be separated from the $CO_2$. Each purified constituent may or may not be diluted in modifier S1, . . . , S6.

Each purified constituent is separated in the separators 27a, 27b, followed by a step of drainage of the separators by opening the valves 30a and 30b. The gaseous $CO_2$ leaving the separator 27a, 27b is recycled. Collection to the automated arm 5B is carried out by selection of the valve C2a. In the embodiment example, valve C2b, in this case, may be coupled to a second automated arm.

The second automated arm 5B moves in the XY plane and goes down to the collecting plate 4B along an axis Z2 to deposit the purified constituent in one of the test tubes. It repeats the operation as many times as there are purified constituents collected by the collection system 27.

According to another embodiment, the sampling device 5 is equipped with a third automated arm movable in translation along an axis Z3 (not shown) parallel to axis Z2. The third arm also moves in the XY plane. Thus, the third automated arm is actuated at the same time as the second automated arm 5B for depositing the purified constituent in the collecting plate 4B. This makes it possible to speed up the collection operation in preparative step 20. The second and the third automated arms may operate according to a method of collection disclosed in document FR3021229, which may be referred to for further information.

In the example illustrated, the preparative step 20 comprises, after the collection operation 206, when collection is not directed to arm 5B, an operation of recycling 207 of the supercritical fluid, here $CO_2$. Note that the recycling operation 207 is only carried out when all the fractions of the product P have been collected and the supercritical fluid has been isolated from the environment. The recycled fluid is then fed back into the circuit before the first switching valve V1.

In one embodiment example, in the same way as the first analytical step 10, the preparative step 20 further comprises a first cleaning operation 201 upstream of the operation of first pumping and second pumping and a second cleaning operation 208 placed at the end of the preparative step 20.

After the preparative step 20, a second switching step X2 is put in place. It consists of switching the first valve V1, the second valve V2 to the analytical route 1. In this example and in contrast to the first switching step X1, the second switching step X2 comprises
- an operation of checking 501 the purity of the fractions of the product P at the end of the preparative step 20
- a route changing operation 502.

In this example, there is then a second analytical step 30, illustrated in FIG. 4 and in FIG. 5. During this analytical step 30, the same operations as the first analytical step 10 are carried out except that the analyte this time is one or more purified constituents of the product P. More precisely, the following operations are carried out:
- a first cleaning operation 301 of the injection circuit 13A,
- an operation 302 of first pumping of the supercritical fluid $CO_2$ and of second pumping of a modifier,
- an operation of injection 303 of a purified constituent into one of the analytical columns 14,
- an operation of separation 304 of the purified constituent,
- a detection operation 305 by the detection systems 15 and 16 in order to determine the purity of the purified constituent,
- an operation of recycling 306 of the supercritical fluid, then in the gaseous state;
- a second cleaning operation 307 of the injection circuit 13A.

It should be noted that several purified constituents of the product P may be analyzed alternately during this step. For this, the purified constituents are injected one after another into a chromatographic column 14.

In one example, the modifier S1, . . . , S6 used for the operation 302 of first pumping and second pumping is the modifier S1, . . . , S6 for which the optimum analysis conditions are obtained. This modifier was defined in the preceding steps, in particular during the first analysis step 10.

In order to carry out the method of chromatography according to the invention that has just been described, the installation 100 comprises a computer control device for the different parts of the installation. The control device comprises a system for identifying the parameters or a PID system, on the basis of which the elements of the installation (pumps, valves) may be actuated for changing between the analytical route and the preparative route. The control device also allows the operator to monitor the operating conditions in real time during the method.

Moreover, the control device controls the automated arms, the switching of the switching valves between the two routes or starting the detection systems.

The control device is able to receive programming of the method according to an embodiment of the invention. It is able to determine whether the result of an analysis step, for example of the analytical step, complies with the predefined reference values or which is the best analysis condition in the case when several modifiers are used. The computer control device thus makes it possible to perform a succession of analytical and preparative analysis steps automatically and in an optimum analysis condition without the need for the intervention of an operator.

Of course, it is possible to make many modifications to the invention while remaining within the scope of the invention. In particular, the supercritical fluid may be replaced with a fluid of the liquid type when carrying out the method of chromatography according to the invention.

The invention claimed is:

1. A method of supercritical fluid or liquid chromatography of a product P, said method comprising the steps of:
    an analytical step according to an analytical route comprising:
        an analytical pumping operation comprising a first pumping of a first aliquot of a supercritical fluid or liquid and a second pumping of a first aliquot of a modifier,
        an injection operation of a first aliquot of at least one sample of the product P or of at least one constituent of the product P into at least one chromatography column, the product P or the constituent of the product P being eluted with the first aliquot of the supercritical fluid or liquid and the first aliquot of the modifier,
        a separation operation of the constituents of the product P,
        a detection operation of the composition of the product P or of the constituents of the product P,
    a switching step comprising:
        a verification operation comprising a substep of comparing the analysis results with one another or with reference values representing optimum analysis conditions, and
        an automatic route change operation between the analytical route and a preparative route as a function of the preceding comparison,
    a preparative step resulting from the automatic route change operation of the switching step, wherein the preparative route comprising:
        a preparative pumping operation comprising a first pumping of a second aliquot of the supercritical fluid or liquid and a second pumping of a second aliquot of the modifier,
        another injection operation of a second aliquot of the at least one sample of the product P into at least one chromatography column, product P being eluted in the chromatography column by the second aliquot of the supercritical fluid or liquid, and the second aliquot of the modifier,
        another separation operation of the constituents of the product P,
        a detection operation of the constituents of the product P,
        another collection operation of one or more constituents of the product P in an open bed at atmospheric pressure, and
        a preparative recycling operation of at least a portion of the second aliquot of the supercritical fluid, wherein the recycling operation occurs only upon completion of the collection operation of the preparatory stage.

2. The method according to claim 1, comprising, continuously and in this order:
    a first analytical step,
    a first switching step,
    a preparative step,
    a second switching step, and
    a second analytical step comprising the same operations as the first analytical step.

3. The method according to claim 2, wherein the second switching step comprises:
    an operation of checking the purity of the fractions of the product P at the end of the preparative step,
    an operation of automatic route changing between the analytical route and a preparative route as a function of the preceding check.

4. The method according claim 1, wherein the recycling operation of the preparative step further comprises reintroducing the supercritical fluid to the analytical pumping operation.

5. The method according to claim 1, wherein the analytical step further comprises an analytical recycling operation following the detection operation of the analytical step.

6. The method according claim 5, wherein the analytical recycling operation recycles at least a portion of the first aliquot of the supercritical fluid.

7. The method according to claim 6, wherein the analytical recycling operation occurs only upon completion of the collection operation of the preparatory stage.

8. The method according to claim 6, wherein the analytical recycling operation occurs only upon completion of the detection operation of the analytical stage.

9. The method according claim 6, wherein the analytical recycling operation further directs the recycled portion of the first aliquot of the supercritical fluid to a reservoir of the supercritical fluid.

10. The method according to claim 1, wherein the analytical step and the preparative step each comprise
    a first cleaning operation of an injection circuit and collection circuit upstream of the respective analytical pumping operation and preparative pumping operation of the first pumping and of the second pumping, and
    a second cleaning operation of the injection circuit and collection circuit downstream of the collection operation of the preparative step or of the detection operation of the analytical step.

11. The method according to claim 1, wherein the detection operation is carried out by ultraviolet-visible spectrophotometry and/or by mass spectrometry.

12. The method claim 1, wherein the supercritical fluid is carbon dioxide.

13. An installation for supercritical phase chromatography of a product P arranged for carrying out the method according to claim 1, comprising an analytical route and a preparative route installed in parallel, the analytical route and the preparative route each comprising:
- a first pump of the supercritical fluid or liquid,
- a second pump of the modifier,
- an analysis system comprising at least one chromatographic column,
- an injection system of the at least one sample of the product P or of the separated constituents of the product P into the columns of the analysis system, the injection system being arranged between the first pump of the supercritical fluid or liquid and the analysis system, the installation comprising a collection system of fractions of the product P and the supercritical fluid or liquid to be recycled; and at least one detection system, the installation comprising,
- a first switching valve arranged upstream of the injection systems, which is positioned so as to allow injection of the product P or of the constituents of the product P into the analytical route or into the preparative route,
- a second switching valve arranged upstream of the pumps of the supercritical fluid or liquid, which is actuated so as to allow the supercritical fluid or liquid to circulate in the analytical route or in the preparative route,
- a computer control device, the first switching valve and the second switching valve being activated at the same time by the computer control device so as to direct the product P or the constituents of the product P respectively and the supercritical fluid or liquid into the route resulting from the switching step.

14. The installation according to claim 13, wherein a set of plates comprising recipients and a sampling device comprising several automated arms are configured for collecting or depositing the product P or fractions of the product P disposed in the set of plates.

15. The installation according to claim 13, comprising a system for recycling the supercritical fluid, wherein the system for recycling is installed downstream of the collection system.

16. The installation according to claim 13, wherein the collection system is connected on the one hand to a recycling system and on the other hand to a sampling device, said collection system being arranged so that the supercritical fluid is sent to the recycling system once the fractions of the product P have been sent to the sampling device.

17. The installation according to claim 16, comprising a switching means arranged downstream of the analysis system intended to put the detection system in series with the analytical route and the preparative route.

18. The installation according to claim 17, comprising a flow regulator installed after the switching means.

19. The installation according to claim 13, wherein the detection system is made up of two detection systems installed in parallel, the first system being an ultraviolet-visible spectrophotometer and the second system being a mass spectrometer.

20. The method according claim 1, wherein the preparatory recycling operation further directs the recycled portion of the second aliquot of the supercritical fluid to a reservoir of the supercritical fluid.

* * * * *